July 20, 1965   H. W. RICE   3,195,553
BURNER CONTROL VALVE MECHANISM
Filed April 23, 1962
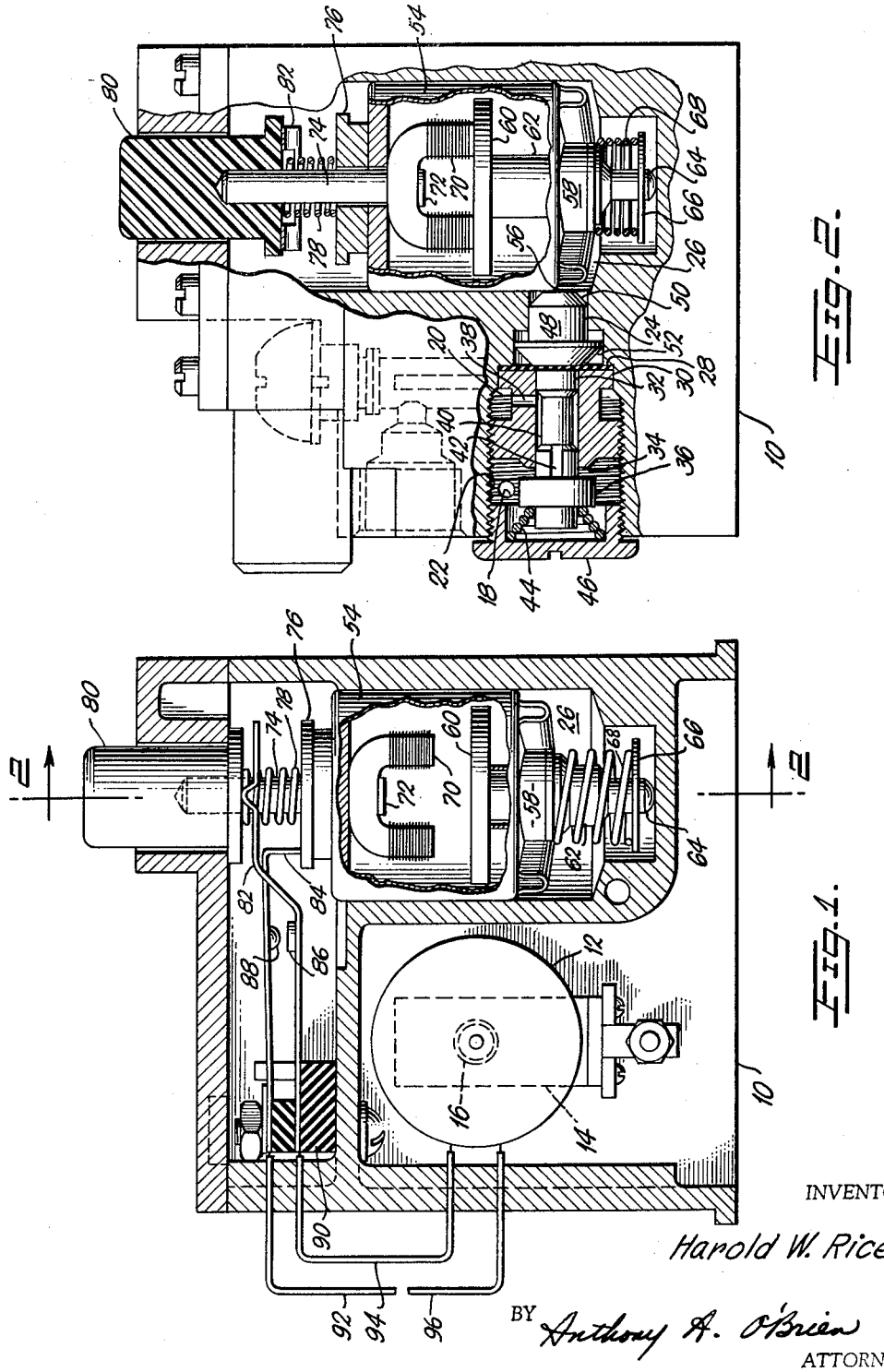
INVENTOR
Harold W. Rice
BY Anthony A. O'Brien
ATTORNEY United States Patent Office 3,195,553
Patented July 20, 1965

3,195,553
BURNER CONTROL VALVE MECHANISM
Harold W. Rice, Fullerton, Calif., assignor to Robertshaw Controls Company, Richmond, Va., a corporation of Delaware
Filed Apr. 23, 1962, Ser. No. 189,351
3 Claims. (Cl. 137—66)

This invention relates to switch mechanisms and in particular to a switch interlock mechanism forming an interlock between a solenoid operated valve and an automatic electromagnetic pilot valve.

Solenoid operated valves are utilized in heating systems for controlling a flow of gas to the main burner of the heating system in response to thermostatic control. In order to ignite the main burner upon thermostatic demand, a pilot burner is positioned in proximity to the main burner. The flow of gas to the pilot burner is controlled by an electromagnetic pilot valve means including a thermo-electric holding magnet which is energized by a thermocouple disposed in the flame of the pilot burner. The holding magnet includes a reset button which is operative to hold the pilot valve means in an open position for igniting the pilot burner and until the holding magnet is sufficiently energized by the thermocouple; upon release of the reset button, the pilot valve means is held in its open position by the holding magnet.

An object of this invention is to interlock the operation of a solenoid valve with the operation of an electromagnetic valve.

Another object of this invention is to permit safe lighting of a pilot flow of gas by opening the energizing circuit of a solenoid valve which shuts off a main flow of gas.

This invention has another object in that operation of the reset means of a safety pilot valve causes deenergization of a solenoid operated valve.

This invention has another object in that the switch of a solenoid operated valve is closed only when a pilot safety magnet is energized.

It is a further object of this invention to move a pilot safety magnet toward a fixed armature during a resetting operation.

In the preferred embodiment of this invention, a solenoid operated valve is controlled by a switch and a safety pilot valve is controlled by an electromagnet. The pilot valve is open whenever the electromagnet is energized and whenever a reset button moves the electromagnet. The solenoid switch is interlocked with the reset button so that the solenoid operated valve is closed during pilot lighting and upon release of the reset button, the solenoid switch is closed and the solenoid operated valve is opened.

Other objects and advantages will become apparent from the following description of the preferred embodiment shown on the drawings, wherein:

FIG. 1 is a longitudinal section with parts broken away of a control device embodying this invention; and, FIG. 2 is a partial section taken substantially along the line 2—2 of FIG. 1 but shown in another operative position.

As is illustrated on the drawing, the control device embodying this invention includes a casing 10 providing a suitable internal support for a solenoid 12. An armature 14 on one end of the solenoid 12 carries a valve member 16 for controlling a main of gas through casing ports (not shown) to the main burner (not shown) of a heating plant. It is to be understood that the valve member 16 may be any type of fluid flow control means and its association with solenoid 12 is only for the purpose of illustrating that energization and deenergization of the solenoid 12 controls the flow of gas to the main burner.

A pilot flow of gas to a pilot burner (not shown) has a separate path through the casing 10 as schematically illustrated in FIG. 2 by the spaced passageways 18 and 20. The passageways 18 and 20 lead into a threaded bore 22, the inner end of which is stepped to a reduced diameter 24 communicating with a magnet chamber 26. A flexible diaphragm 28 seals the inner end of bore 22 and is held against one of the steps in the bore 22 by a threaded bushing 30 through which a spool valve 32 is slidably mounted. One end of the bushing 30 forms a valve seat 34 which is engageable by a valve member 36 on the spool valve 32. An intermediate part of the bushing 30 has a drilled passage 38 leading from the casing passageway 20 to a central bore of the bushing 30. A pilot flow of gas between the valve seat 34 and the passage 38 is permitted by the central part of the spool valve 32 which is reduced at 40 and slotted at 42. The spool valve 32 is biased to a closed position by a conical coiled spring 44 mounted in compression between the valve member 36 and a threaded cap 46 which closes the bore 22.

The inner reduced bore 24 slidably carries a pilot valve actuator 48 having a tapred flange 52 on one end in engagement with the diaphragm 28 and a conical portion 50 on its opposite end. The conical portion 50 extends into the chamber 26 and is retained in its valve actuating position by a magnet housing 54 as is illustrated in FIG. 2. The magnet housing 54 is slidably moved in the chamber 26 transversely to the movement of the actuator 48. The lower end of housing 54 has a rounded edge 56 which engages the conical portion 50 and the housing upon sliding operation moves the actuator 48 with a camming action.

The bottom of the magnet housing 54 has a centrally aligned hollow cylinder 58 through which the stem 62 of an armature 60 reciprocates. The armature 60 is positioned in the housing 54 and the lower end of the armature stem 62 protrudes through the cylinder guide 58 and is positioned exteriorly of the housing 54. The lower end of armature stem 62 is provided with a screw 64 that abuts the bottom wall of the chamber 26. A retainer washer 66 is secured to the lower end of armature stem 62 by the screw 64 and a coil spring 68 is mounted in compression between the washer 66 and the bottom of the cylinder guide 58.

As is illustrated in FIG. 1, an electromagnet 70 is fixed to the lower end of a plunger rod 74 by any suitable means such as a rivet 72. The rod 74 extends centrally through the top of housing 54 and a collar 76 mounted on the exterior of the housing 54. A coil spring 78 surrounds an intermediate portion of rod 74 and is mounted in compression between the collar 76 and the lower end of a reset push button 80. The reset button 80 has a central bore by which it is slidably mounted on the free end of the rod 74. In its normal released position, the reset button extends through an opening in the casing 10 for manual operation and an inner flange engages the interior casing wall to define the limit of outward movement of the push button 80.

The undersurface of the push button 80 is engaged on the opposite sides of the rod 74 by the bifurcated extension 82 (FIG. 2) of a switch blade which carries a contact 86 intermediate its ends. The top surface of collar 76 is engaged by the perpendicularly bent extension 84 of another switch blade, which extension 84 extends through the yoke opening formed by the bifurcated extension 82. The two switch blades are made of spring steel and are superimposed in spaced parallel relation so that the contact 86 on the lower blade is positioned for engagement with a contact 88 on the upper blade. The fixed end of the switch blades are mounted in a terminal block 90 from which suitable lead wires 92 and 94 protrude. The lead wire 94 is serially connected to the winding of the solenoid 12 from which another lead wire 96 extends.

The two lead wires 92 and 96 are electrically connected to a power source and if desired a thermostatic control device is placed in series with the winding of the solenoid 12 to operate the solenoid valve member 16 in response to thermostatic demand.

As is shown in FIG. 1 the control device is in its inoperative position with the main valve closed and the pilot valve closed. To place the device in operation, the push button 80 is depressed, causing downward movement of the rod 74, the collar 76, the housing 54, and the electromagnet 70 as a unit. The operating elements are thus moved to their positions shown in FIG. 2 wherein the electromagnet 70 is in engagement with its fixed armature 60 and the pilot valve member 36 is moved to its open position in response to the movement of the actuator conical portion 50 by the housing edge 56. During this downward movement, the switch blade extension 84 is normally biased to follow the downward movement of the collar 76; however, there is no engagement between the contacts 86 and 88 because the switch blade extension 82 follows the downward movement of the push button 80. With such an arrangement, the pilot burner may be safely ignited without danger of explosion from the main burner inasmuch as the solenoid operated valve is in a closed position.

After ignition of the pilot burner, the applied force on the manually operated reset button 80 is removed permitting the reset button 80 to return to its normal position (FIG. 1) by the bias of the coil spring 78. The normal bias of the switch blade extension 82 causes the extension 82 to follow the return movement of the push button 80. This upward movement causes the contact 86 to engage the contact 88 and lift the switch blade extension 84 off of the collar 76. This closes the circuit for the solenoid 12 which will open and close the main valve member 16 in response to thermostatic action.

In addition to the safe lighting feature described above, the switch interlock mechanism provides 100% shutoff of the main gas flow and the pilot gas flow in the event the pilot flame is extinguished for any reason. When the pilot flame is extinguished, the thermocouple associated therewith cools and deenergizes the electromagnet 70. As soon as the electromagnet 70 is deenergized, it is released from the armature 60 by the bias of the coil spring 68 which causes upward movement of the magnet 70, the housing 54, the collar 76 and the rod 74. During its upward movement, the collar 76 engages the switch blade extension 84 and lifts the contact 88 off of the contact 86. Separaration of the contacts 86 and 88 thus opens the circuit for the solenoid 12 and closes the main valve 16.

It is to be noted that the rod element 74 is of such a length as to prevent separation from the bore of the reset button 80 when the reset button 80 is returned to its normally released position.

In asmuch as the present invention is subject to many modifications and various changes in structural details, it is intended that all matter contained in the foregoing description of the preferred embodiment and shown on the drawing shall be interpreted as illustartive and not in a limiting sense.

What is claimed is:
1. In a switch mechanism, the combination comprising solenoid operated valve means for controlling a main fuel flow, pilot valve means for controlling a pilot fuel flow, an electromagnet movable between attracted and released positions, a housing enclosing said electromagnet and being secured thereto for unitary movement, an actuator engageable by said housing for moving said pilot valve means to an open position when said electromagnet is in an attracted position and permitting movement of said pilot valve means to a closed position when said electromagnet is in a released position, a rod element extending from said housing and being movable therewith, a reset button mounted on said rod element and being depressed under an applied force for moving said housing and said electromagnet to an attracted position causing opening of said pilot valve means, biasing means between said button and said housing acting on said reset button whereby removal of the applied force moves said reset button away from said housing, first and second switch blades in circuit with said solenoid operated valve means and being movable relative to each other between circuit open and circuit closed positions for controlling said solenoid operated valve means, and extension means on said first and second switch blades for independent operation by said reset button and said housing respectively, said extension means on said first switch blade operatively engaging said reset button and said extension means on said second switch blade operatively engaging said housing in such a manner that when said reset button and said housing move as a unit the switch blades are in a circuit open position and when said reset button moves away from said housing the switch blades are moved to a circuit closed position.

2. The combination as recited in claim 1 wherein said first switch blade is biased toward said reset button and said second switch blade is biased toward said housing.

3. The combination as recited in claim 1 wherein the extenesion means on said first switch blade causes the extension means on said second switch blade to move away from said housing with said reset button when said electromagnet remains in its attracted position.

References Cited by the Examiner
UNITED STATES PATENTS

| | | | |
|---|---|---|---|
| 2,198,453 | 4/40 | Mantz | 137—66 |
| 2,237,577 | 4/41 | Ray | 137—66 X |
| 2,253,670 | 8/41 | Wetzel | 137—66 X |
| 2,658,686 | 11/53 | Caparone | 137—66 X |

WILLIAM F. O'DEA, *Primary Examiner.*

ISADOR WEIL, *Examiner.*